United States Patent [19]
Jost et al.

[11] Patent Number: 5,267,901
[45] Date of Patent: Dec. 7, 1993

[54] LUBRICATION FOR A TRIPOD JOINT

[75] Inventors: Dieter Jost, Troisdorf; Werner Krude, Neunkirchen-Wolperath, both of Fed. Rep. of Germany

[73] Assignee: GKN Automotive AG, Siegburg, Fed. Rep. of Germany

[21] Appl. No.: 786,710

[22] Filed: Nov. 1, 1991

[30] Foreign Application Priority Data

Nov. 2, 1990 [DE] Fed. Rep. of Germany ....... 4034805

[51] Int. Cl.⁵ .................... F16C 1/24; F16D 3/205
[52] U.S. Cl. .................... 464/11; 464/111; 464/123; 464/132; 464/905
[58] Field of Search .................... 464/11-14, 464/111, 123, 124, 131-133, 905

[56] References Cited

U.S. PATENT DOCUMENTS

| | | | |
|---|---|---|---|
| 3,881,324 | 5/1975 | Girguis | 464/14 |
| 4,192,154 | 3/1980 | Nakamura et al. | 464/111 |
| 4,379,706 | 4/1983 | Otsuka et al. | 464/905 X |
| 4,747,803 | 5/1988 | Kimata et al. | 464/111 |
| 4,786,270 | 11/1988 | Iwasaki | 464/111 |
| 4,810,232 | 3/1989 | Farrell et al. | 464/111 |
| 4,904,227 | 2/1990 | Sasaki et al. | 464/111 |

FOREIGN PATENT DOCUMENTS

| | | | |
|---|---|---|---|
| 2600730 | 12/1987 | France. | |
| 2034862 | 6/1980 | United Kingdom | 464/11 |

*Primary Examiner*—Daniel P. Stodola
*Assistant Examiner*—William G. Battista, Jr.
*Attorney, Agent, or Firm*—Harness, Dickey & Pierce

[57] ABSTRACT

A tripod joint has an outer joint part (1) with three uniformly circumferentially distributed axis-parallel recesses (2) forming circumferentially opposed tracks (4, 5), and an inner joint part (6) having a tripod-shaped cross-section with three circumferentially distributed arms (7) which extend into the recesses (2) of the outer joint part (1). Roller assemblies (8) are supported on the arms 7. Each roller assembly has at least one inner ring (12) and one outer roller (9) supported by the arms (7). The roller surface of the outer roller (9) rolls directly on the track (4, 5), with surfaces in each case being paired, such surface pairing enabling at least one radial sliding movement of at least part of a roller assembly (8) relative to the associated arm (7). A space (16) is formed between the roller assemblies (8) and the arms (7) for storing a first lubricant for the surface pairs enabling the radial sliding movement. The remaining joint interior or cavity (3) is filled with a second lubricant.

10 Claims, 3 Drawing Sheets

LUBRICATION FOR A TRIPOD JOINT

BACKGROUND AND SUMMARY OF THE INVENTION

The invention relates to tripod joints. The joints include an outer joint part, with three uniformly circumferentially distributed axis-parallel recesses forming circumferentially opposed tracks, and an inner joint part, with a tripod shaped cross-section and three circumferentially distributed arms which extend into the recesses of the outer joint part. Roller assemblies are supported on the arms. Each roller assembly includes at least one inner ring and one outer roller. The roller surface of the outer roller rolls directly on the track, with surfaces in each case being paired, such surface pairing enabling at least one radial sliding movement of at least part of a roller assembly relative to the associated arm.

Tripod joints are known which include a number of different designs, examples being DE-PS 27 48 044, DE-PS 28 31 044 and Application 39 36 601.4. In each case, it is the object of the roller assembly selected that the friction forces leading to vibration excitations from the articulated joint when the rollers move relative to the outer joint part should be reduced by changing to a pure rolling movement, with only the radial sliding movement of the roller assembly relatively to the arm and the angular movement of the roller assembly relative to the arm being accommodated by friction bearings subjected to higher friction loads.

There exists a problem of the above designs in that the sliding movements, especially if they affect parts in line contact, such as a ball head located in a cylindrical sleeve, require lubricants suitable for being subjected to very high loads. This considerably increases the costs of the lubricants and thus of the joint as a whole.

It is the object of the present invention to provide an efficient joint which reduces the cost of the required lubricant. The objective is achieved by providing a space encapsulated relative to the remaining joint interior for storing a first lubricant for the surface pairs permitting the radial sliding movement. The remaining joint interior is filled with a second lubricant. The means enables the volume of the high-grade greases used for lubricating the sliding movements of parts to be considerably reduced. The very much larger remaining joint interior is filled with a standard grade grease at considerably reduced costs. The latter is subjected to substantially only rolling surface loads, these loads being the rolling movement of the outer roller on the tracks in the outer joint part and possibly the rolling movement in a roller bearing in the roller assembly.

As with an articulated joint, the radial movement component of the arms relative to the outer rollers leads to changes in the geometric conditions between the slidingly movable and pivotable parts. Preferably a resilient element is used to contain the lubricant volume and enable the volume to be adjusted without losing any lubricant or without exchange of the encapsulated first lubricant and the second lubricant in the remaining joint interior. If the arm is directly radially movable in a roller carrier or inner ring, the resilient element may be provided, especially in the form of a resilient cover, to seal the cross-section of the arm radially outside its surface. In addition, it is possible to use a resilient collar which encloses the arm neck below the roller assembly and forms a supplementary space containing an encapsulated volume of lubricant. However, it is also possible to do without the latter if the lubricant is contained between the arm and the cover.

From the following detailed description taken in conjunction with the accompanying drawings and subjoined claims, other objects and advantages of the present invention will become apparent to those skilled in the art.

DETAILED DESCRIPTION OF THE PREFERRED EMBODIMENTS

Figure 1:
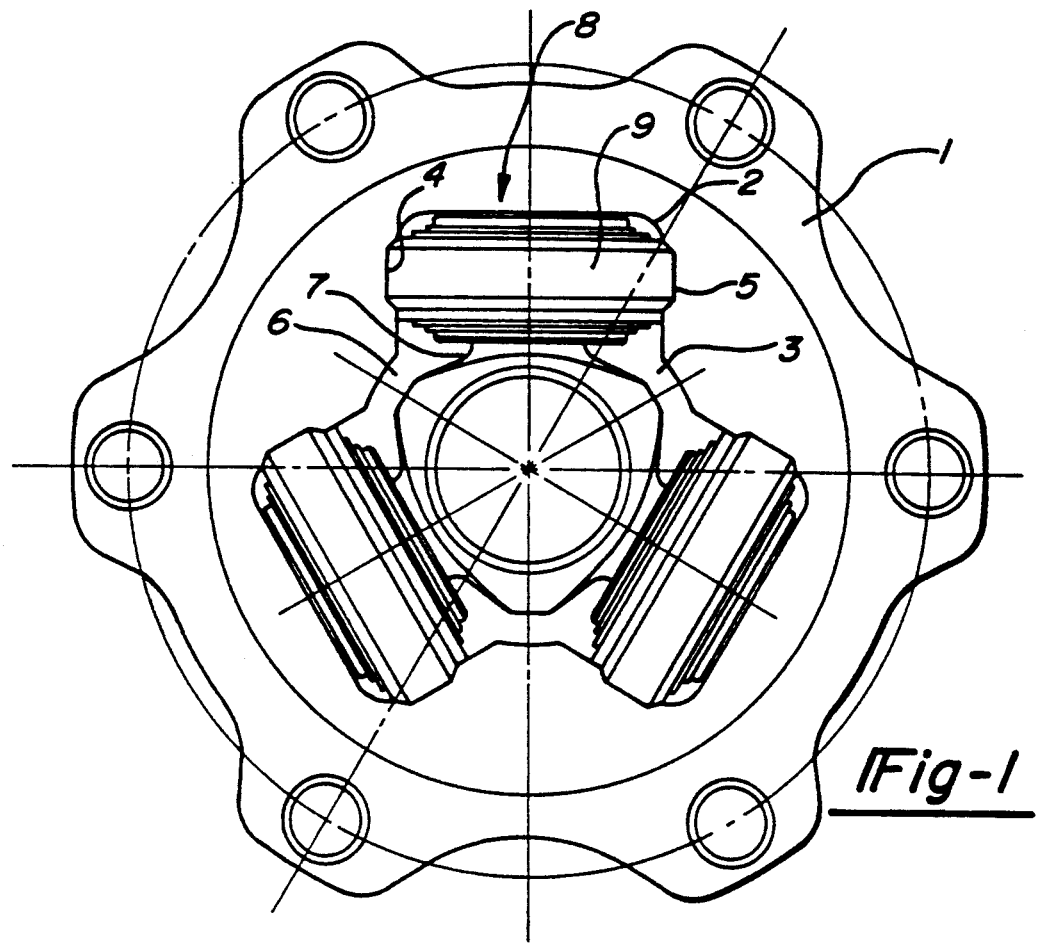
FIG. 1 is an axial view of a joint in accordance with the present invention.

FIG. 1 shows an outer joint part 1 in accordance with the invention. The outer joint part 1 has three longitudinal recesses 2 which are each circumferentially offset by 120 and connected to each other via a central joint interior or cavity 3. Each of the longitudinal recesses is provided with circumferentially opposed tracks 4 and 5. The outer joint part 1 includes an inner joint part 6 in the form of a tripod with arms 7 which circumferentially extend into the longitudinal recesses 2 of the outer joint part 1. A plurality of roller assemblies 8 are pivotable and radially movable relative to and supported by the arms 7. The roller assemblies 8 include outer rollers 9 which are in direct contact with the tracks 4 and 5. Further details regarding the roller assembly 8 may be taken from FIG. 2.

Figure 2:
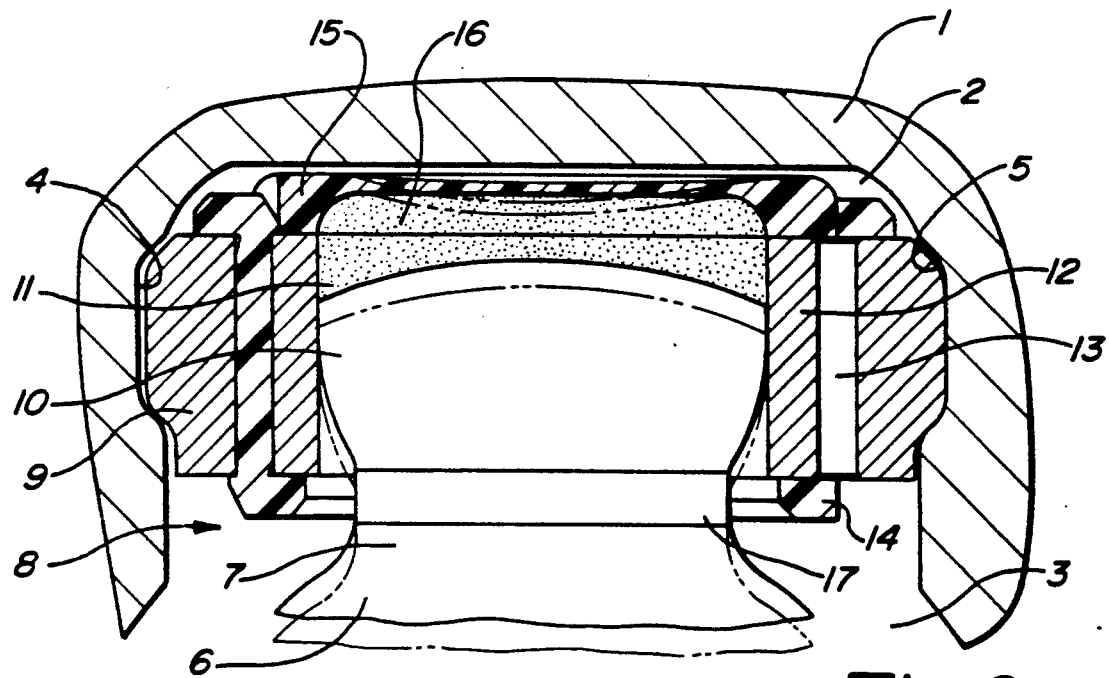
FIG. 2 is a sectional view of a roller assembly in accordance with the invention.

FIG. 2 shows a partial section of the outer joint part 1 with the longitudinal recess 2 which has access to the joint interior 3 and which forms opposed tracks 4 and 5. As far as the inner joint part 6 is concerned, FIG. 2 shows part of it as well as an arm 7 with a part-spherical head 10.

The head 10 engages a cylindrical inner recess 11 of part of the roller assembly 8. The head 10 is radially movable and pivotable therein. The roller assembly 8 includes an inner ring or bearing carrier 12, roller bearings 13, a holding and cage element 14 and the outer roller 9. A resilient cover 15 is secured or glued to the radial exterior of the bearing carrier 12. A space 16 for storing a variable volume of lubricant, as shown by the dashed lines indicating the movement of the head 10 and the adjusting movement of the cover 15, is formed between the cover 15, head 10 and inner recess 11.

Figure 3:
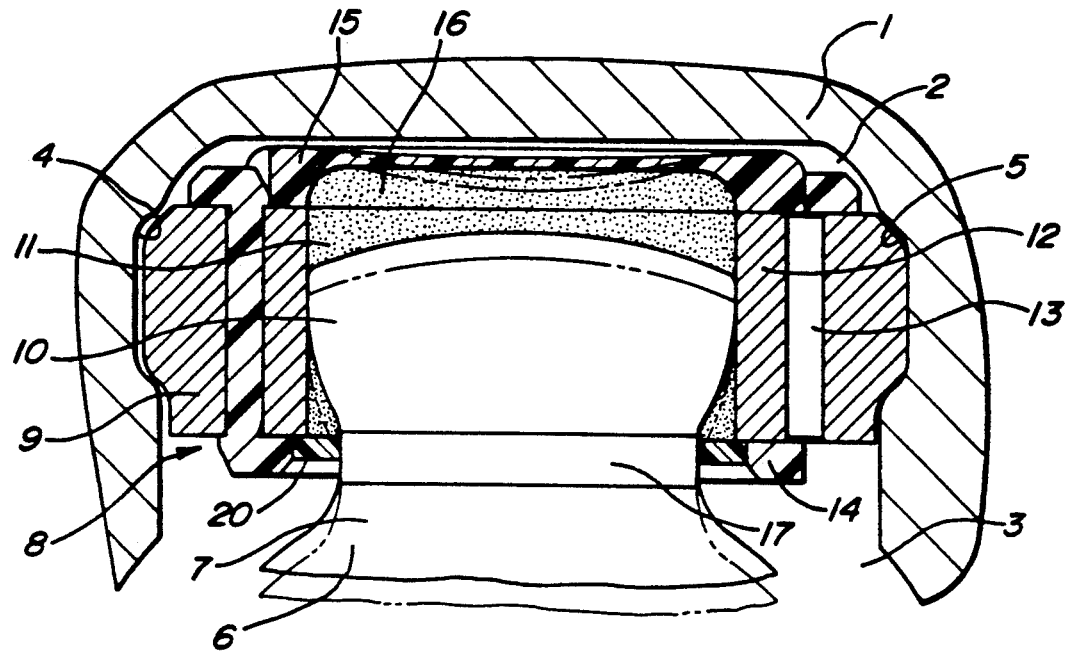
FIG. 3 is a sectional view of a roller assembly in accordance with another embodiment of the invention.
Figure 4:
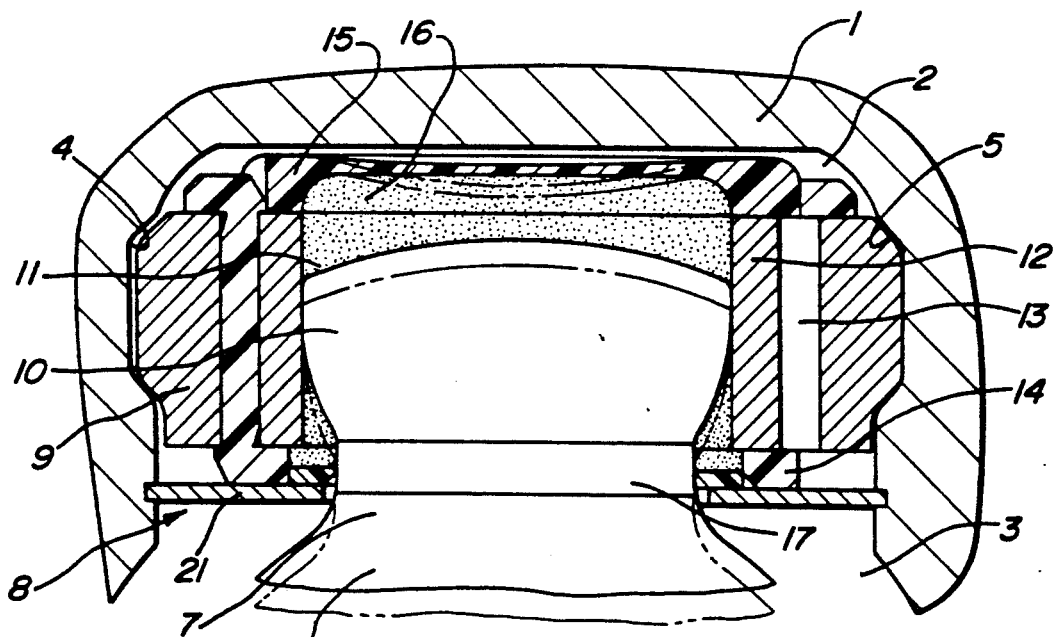
FIG. 4 is a sectional view of a roller assembly in accordance with another embodiment of the invention.

A further resilient, downwardly sealing, collar-shaped element 20 is shown in FIG. 3 surrounding the region of the cylindrical neck 17 of the arm element. FIG. 4 illustrates another embodiment of a collar shaped element 21 extending downwardly to contact a track-parallel edge of the outer joint part 1. The collar is positioned below the head to provide and seal an additional space for the lubricant.

Figure 5:
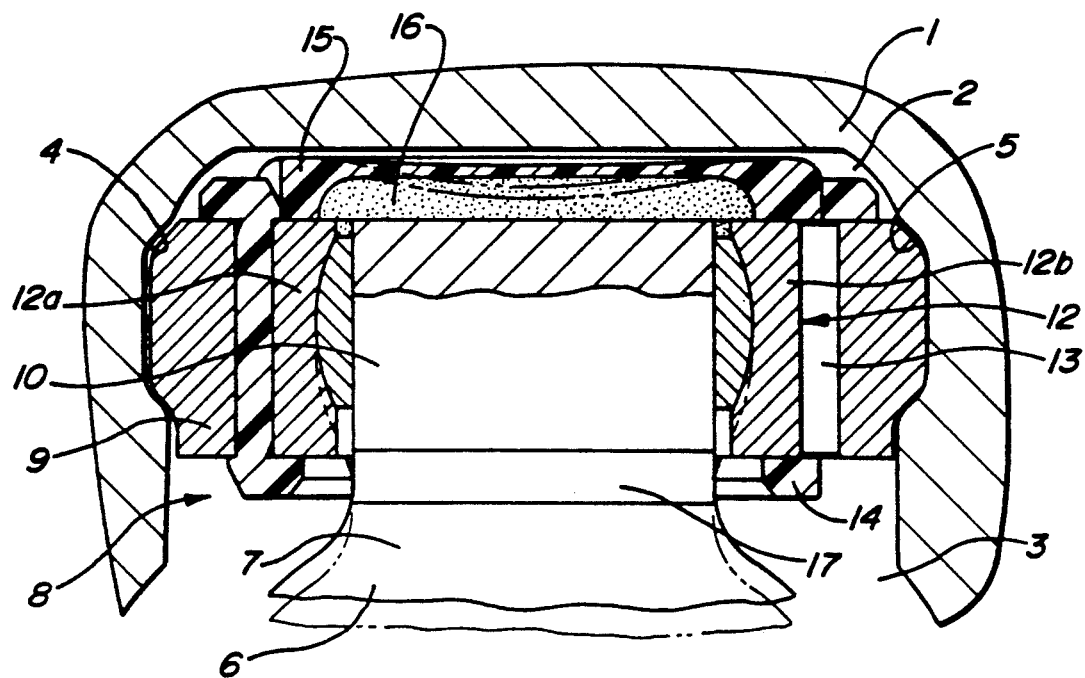
FIG. 5 is a sectional view of a roller assembly in accordance with another embodiment of the invention.

FIG. 5 illustrates another embodiment of the invention. Here, the head 10 is cylindrical with the inner ring 12 divided into two components 12a, 12b. The first component 12a is an externally spherical inner sleeve radially movable on the arm. The second component 12b is an outer sleeve with an internally spherical recess pivotable on the inner sleeve.

Figure 6:
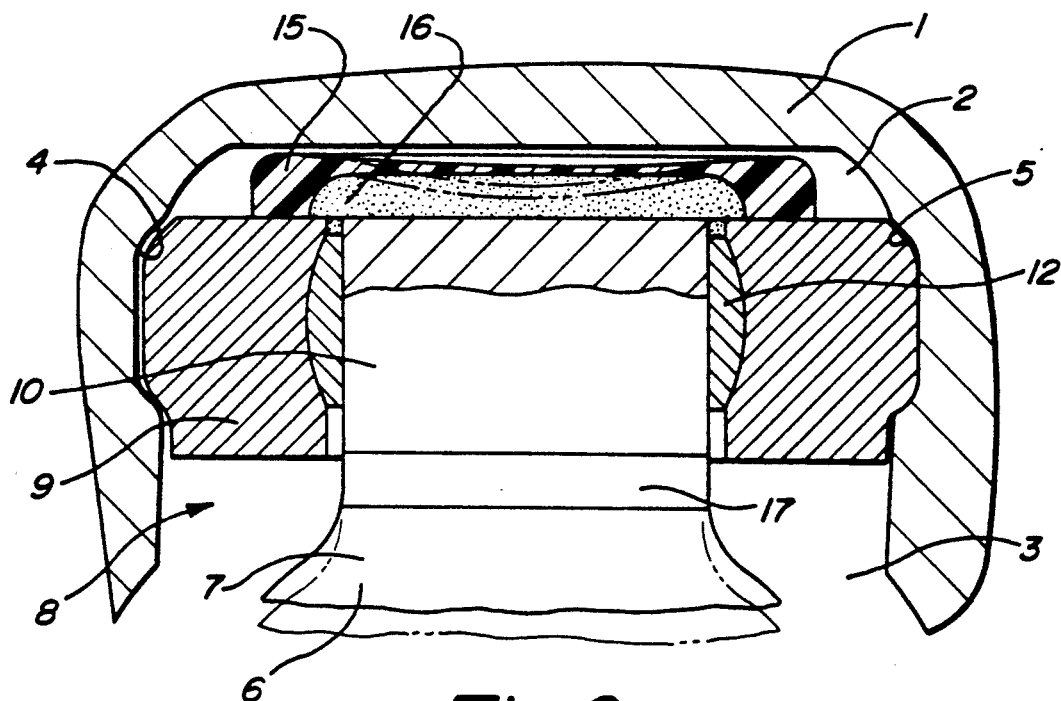
FIG. 6 is a sectional view of a roller assembly in accordance with another embodiment of the invention.

FIG. 6 illustrates a further embodiment of the invention. Here, the arms 7 are cylindrical with an internally cylindrical ring 12. The sleeve is radially movable on the arm 7. The exterior of the ring 12 is spherical and directly engages an internally spherical recess in the other roller 9. The ring is slidingly pivotable on the roller.

We claim:

1. A tripod joint comprising:
   an outer joint part with a joint exterior and three uniformly circumferentially distributed recesses parallel to the center axis of said outer joint part forming circumferentially opposed tracks extending from the interior;
   an inner joint part with a tripod-shaped cross-section and three circumferentially distributed arms which extend into the recesses of the outer joint part;
   a plurality of roller assemblies supported on the arms, each arm supporting a roller assembly, each roller assembly including at least one inner ring and one outer roller, the roller surface of the outer roller rolling directly on one of said tracks formed in the axis-parallel recesses associated with that roller assembly;
   with paired surfaces of different parts of the roller assemblies or of one part of the roller assembly and the arm supporting it respectively being shaped so as to permit at least one radial sliding movement of at least part of each roller assembly relative to its associated arm;
   a volume of a first lubricant; and
   a space between said roller assemblies and said arms for storing said volume of said first lubricant for said paired surfaces permitting the radial sliding movement, means for sealing said space from the remaining joint interior, the remaining joint interior being filled with a second lubricant and said first lubricant being materially different from said second lubricant.

2. A joint according to claim 1 wherein a resilient collar is positioned radially inside the inner ring around the arm to form an additional space for the first lubricant, said additional space being sealed by said resilient collar.

3. A joint according to claim 2 wherein the interior surface of said outer joint part further comprises a recess and an edge parallel to said tracks, and said collar directly contacts the edge at the recess in the outer point part and at the same time supports a radially inward movement of the respective roller assembly relative to the outer joint part.

4. A joint according to claim 1 wherein said arms are each provided with a part-spherical head which is radially slidable and pivotable along an inner surface of the inner ring associated with the arm.

5. A joint according to claim 4, wherein a roller bearing assembly is arranged between the inner ring which directly contacts the spherical head, and the outer roller which directly contacts the tracks.

6. A joint according to claim 1 wherein said arms are each designed to be cylindrical, with each inner ring including an externally spherical inner sleeve radially movable on said arm and an outer sleeve provided with an internally spherical recess and pivotable on the inner sleeve.

7. A joint according to claim 6, wherein a roller bearing assembly is arranged between said outer sleeve and said outer roller directly contacting said tracks.

8. A joint according to claim 1 wherein said arms are each designed to be cylindrical, with the inner ring forming an internally cylindrical, externally spherical sleeve which is radially movable on the arm and said outer roller is designed to have an internally spherical recess which is directly engaged by said externally spherical sleeve so as to be slidingly pivotable.

9. A tripod joint comprising:
   an outer joint part with a joint exterior and three uniformly circumferentially distributed recesses parallel to the center axis of said outer joint part forming circumferentially opposed tracks extending from the interior;
   an inner joint part with a tripod-shaped cross-section and three circumferentially distributed arms which extend into the recesses of the outer joint part;
   a plurality of roller assemblies supported on the arms, each arm supporting a roller assembly, each roller assembly including at least one inner ring and one outer roller, the roller surface of the outer roller rolling directly on one of said tracks formed in the axis-parallel recesses associated with that roller assembly;
   with paired surfaces of different parts of the roller assemblies or of one part of a roller assembly and the arm supporting it respectively being shaped so as to permit at least one radial sliding movement of at least part of each roller assembly relative to its associated arm;
   a volume of a first lubricant;
   a space between said roller assemblies and said arms for storing said volume of said first lubricant for said paired surfaces permitting the radial sliding movement, means for sealing said space from the remaining joint interior, the remaining joint interior being filled with a second lubricant and said roller assemblies include at least one resilient element secured to the roller assemblies and able to accommodate changes in the volume of the first lubricant during the radial sliding movement such that the first lubricant and second lubricant are prohibited from mixing with one another.

10. A joint according to claim 9 wherein said space is located radially outside one of said arms and at least partially formed by the inner surface of the inner ring and is closed by a resilient element which seals off the lubricant.

* * * * *